Oct. 8, 1963  A. KÜCKENS ETAL  3,106,666
ELECTRICAL TIME SWITCHING APPARATUS
Filed Aug. 29, 1960  2 Sheets-Sheet 1

INVENTORS
Alexander Kückens
Wolfgang Niehaus
By Seaman & Seaman
attys

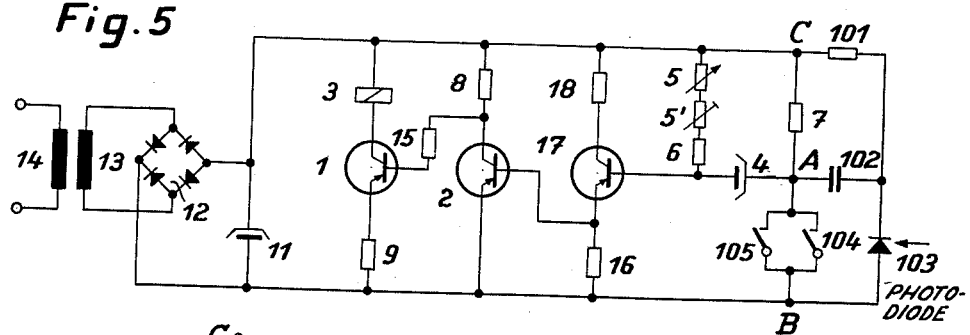
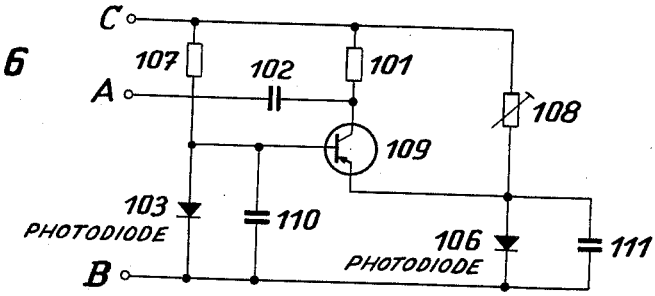
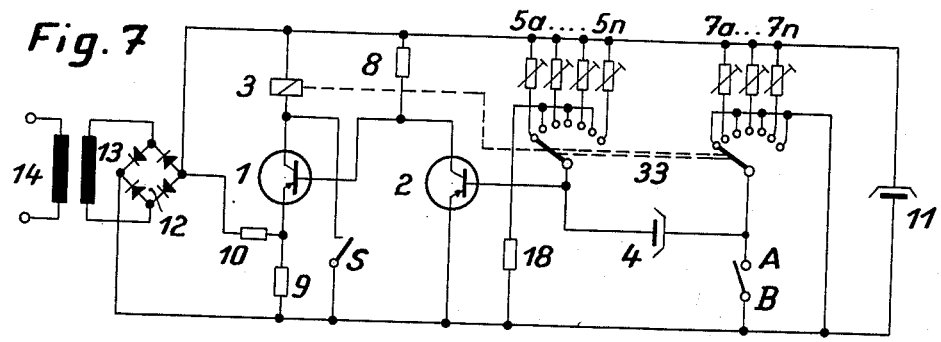
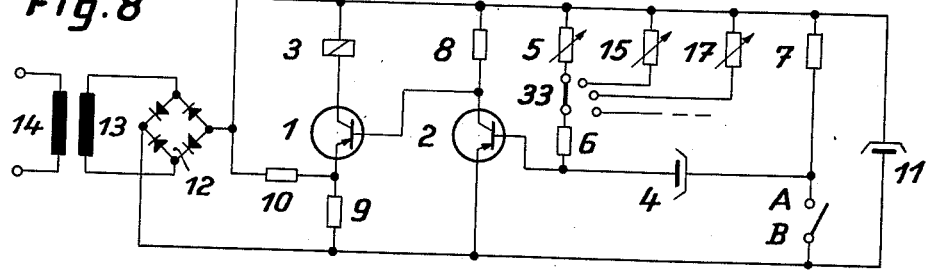

United States Patent Office 3,106,666
Patented Oct. 8, 1963

3,106,666
ELECTRICAL TIME SWITCHING APPARATUS
Alexander Kückens, Hamburg, and Wolfgang Niehaus, Hamburg-Neugraben, Germany; said Niehaus assignor to said Kückens
Filed Aug. 29, 1960, Ser. No. 52,566
Claims priority, application Germany Sept. 23, 1959
4 Claims. (Cl. 317—130)

The present invention concerns an electrical time switching apparatus. Time switching apparatus are known which work mechanically by means of electric motors or with electron tubes. The electron tubes can be heated directly or indirectly and they can be high vacuum- or gas-filled tubes. There are also time switching apparatus which work with cold cathode tubes. All these time switching apparatus are exposed to more or less wear and therefore tend to become inaccurate, which inaccuracies can be of mechanical, electric or also electronic origin. For example a self starting synchronous motor may be used which because of mechanical wear fails to start and thus does not reach its final position. In electronic time switches switching inaccuracies are produced by the ageing of the cathode in heated tubes or by gas absorption in cold cathode tubes. Moreover gas-filled tubes are very radiation sensitive i.e. they are strongly influenced by light, heat, cosmic and similar radiations when they are in use.

The use of the positive properties of transistors has shown an essential improvement in time switches since transistors are not prone to these defects and moreover have essentially smaller dimensions and are substantially insensitive to mechanical vibrations. Moreover with the correct dimensioning they have a substantially unlimited working life. According to the previous state of the art it is not possible to construct time switches with transistors, since transistors are voltage and heat-dependent. The dependence on voltage is also a function of the heat-sensitivity of the transistors and appears as an internal thermal stress on the transistor.

The ambient temperature is an external heating influence on the transistors. Corresponding to the increase of the internal and external temperature of a transistor, the characteristic curve alters and this would therefore lead to inaccuracies in the switching and working operations.

Previously known transistor switches set up, for example, for controlling advertising lighting are quite unreliable in timing because of the abovementioned reasons, therefore they are not used for the purpose of exact working operations with constant switching times such as are found necessary for controlling machine tools or dosing devices for packing machines or for controlling traffic lights etc.

One of the problems on which the present invention is now based is to provide a time switching apparatus constructed with transistors, in which all internal and external influences on the transistors having effect on the mode of operation of the time switching apparatus are removed and are compensated for until the end of the working life of the transistors.

This problem is solved according to the present invention in that transistors of the same type are used which are connected to act in interlocked relation wherein one transistor is blocked while the other is conducting and are subjected to the same ambient temperatures (e.g. by providing heating bridges). With these measures the internal as well as the external undesirable influences are compensated. As an example of a heating bridge two spatially closely adjacent transistors are used, which are embedded in a mass of artificial resin whose heat conductivity is considerably greater than that of air.

In order that the invention may be more readily understood preferred embodiments thereof are described below in conjunction with the accompanying drawings in which.

Figure 1:
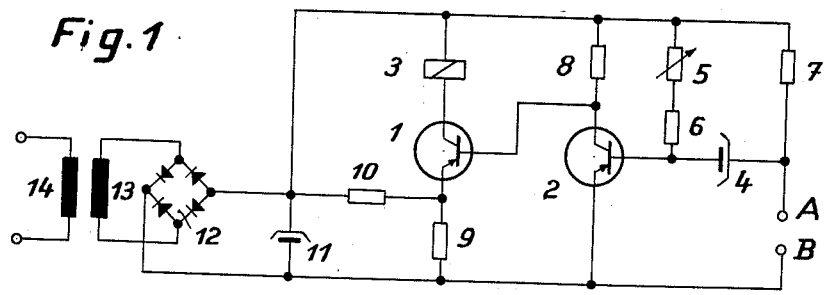
FIG. 1 shows a circuit diagram with a simple time switch.
Figure 2:
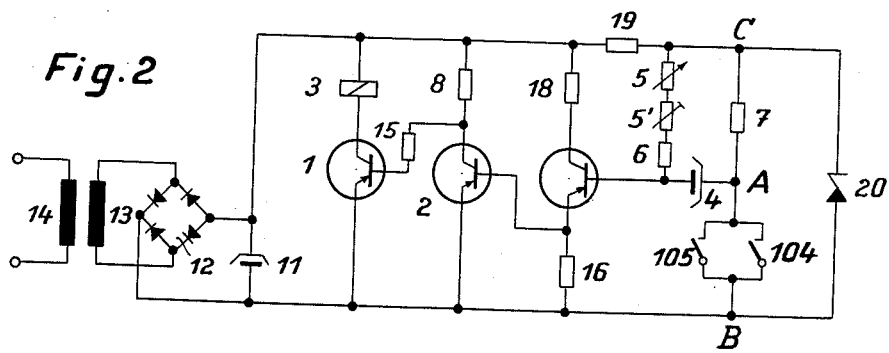
FIG. 2 shows a circuit diagram with a time switch for longer times.
Figure 3:
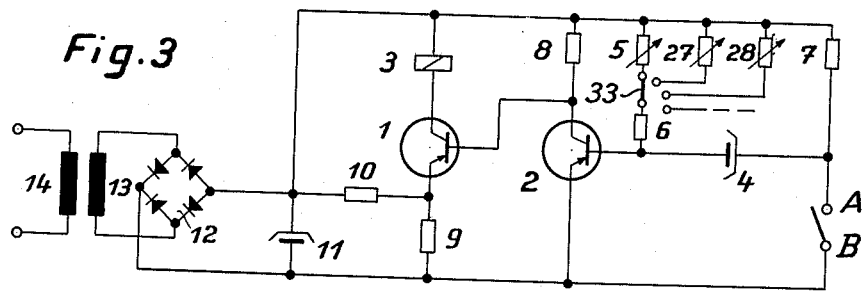
Figure 4:
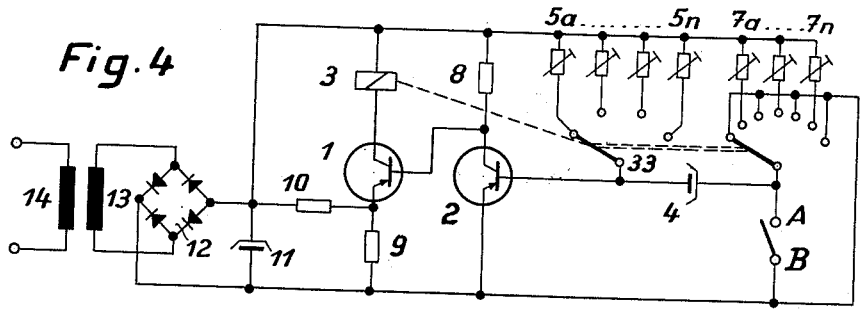

FIG. 3 shows a circuit diagram with a time switch as shown in FIG. 1, but with selectively adjustable times; this figure differs from FIG. 1 only in that the switch 33 and the adjustable potentiometers 27 and 28 are added;

FIG. 4 shows a circuit diagram with a time switch as shown in FIG. 1 with automatic self-reversing successively expiring times;

FIG. 5 shows a circuit diagram with a time switch (as shown in FIG. 2) with manual and photo-electric tripping;

FIG. 6 shows a circuit diagram with a further type of photo-electric tripping as shown in FIG. 5;

FIG. 7 shows a circuit diagram with a time switch as shown in FIG. 1 with automatically expiring pre-selected programme and a starting path;

FIG. 8 shows a circuit diagram with a time switch as shown in FIG. 1 with a different pre-selected times, which can be actuated automatically or by manual actuation.

A functional example is described below in conjunction with FIG. 1.

In FIG. 1 the primary alternating voltage 14 passes through transformer 13 and the secondary coil feeds the working voltage to the rectifier 12 and this in turn charges the charging condenser 11. A charging current flows through resistance 7, condenser 4 and the base of the transistor 2, which switches on the transistor 2. Because of this, the potential drop in resistance 8 is sufficiently great that the transistor 1 which in this case is of the same type as transistor 2 and is biased by the resistances 9 and 10 is cut off. The transistors 1 and 2 are mounted as to be subjected to equal ambient temperatures, and are preferably embedded in a mass of artificial resin, having a heat conductivity greater than that of air. The relay 3 is consequently without current. At the end of charging the condenser 4, enough base current is still flowing through the resistance series 5 and 6 to keep the transistor 2 switched on. If the contacts A and B of the triggering switch are connected together then the base potential of the transistor 2 is shifted with respect to the charging voltage of the condenser 4. Transistor 2 cuts off. Consequently the potential at the positive end of resistance 8 is more negative than the potential of the emitter of transistor 1. The transistor 1 conducts and the relay 3 is operated. The condenser 4 is now charged through resistances 5 and 6, resistance 5 acts as a potentiometer and thus regulating the charging time of condenser 4. As the voltage of the condenser 4 passes through zero the transistor 2 will be switched on. Consequently the transistor 1 will be again cut off and the relay 3 releases. If the connection between A and B is again broken, condenser 4 is again charged but without making much difference to the condition of the remainder of the circuit. The operation recommences at the end of the charging of the condenser 4.

Obviously contacts could be associated with relay 3 to bypass the triggering switch 104 in the working position such as switch 105 of FIG. 2, which contacts A—B are shown here separated having switches 104 and 105 associated therewith in parallel. Thus is could be ensured that even momentary impulses always produced a complete switching movement.

For certain purposes of application it is desirable to design time switching apparatus that longer switching times can be produced satisfactorily. The following ways are available as technical possibilities.

(1) By increasing the condenser in the time determining RC-combination.

(2) By increasing the value of the resistance of the time determining combination.

(3) By increasing both simultaneously.

An increase in the capacity of the condenser however involves an increase in the recharge time and thus the interval times which must be at the disposal of the time switch are necessarily increased. An increase of the value of the resistance however produces a decrease in the wattless current in the RC-combination and is limited by the minimum base current of the control transistor necessary for a satisfactory mode of operation. By increasing both parts a certain compromise solution can be produced which however very quickly finds its limits because of the above-mentioned reasons.

The present invention now further concerns the problem of providing an electrical timing switch, in which the switching time can be considerably increased without increasing the interval times. This is achieved according to the invention in that by increasing the amplification of the control transistor the wattless current of the RC-combination can be decreased in proportion to the increase of the amplification. For example by letting the control transistor be connected in the form of a cascade connection of two or more transistors. Transistors in cascade connection have an essentially higher amplification without however alteration of their other properties, they can, as in the previous case be connected with a further transistor without much difficulty to act in interlocking relation thereto. The character of an interlocked circuit and its advantages therefore remain fully preserved. As a functional example, FIG. 2 shows exactly the mode of operation of FIG. 1, but with the insertion of resistance 15 as the coupling member within the interlocking circuit. This resistance provides high frequency decoupling and thus prevents the occurrence of undesirable oscillations within the system. Because of the high current amplification the potentiometer formed of resistances 9 and 10 in FIG. 1 is no longer necessary. The resistances 16, 18 and 19 are auxiliary resistances for the operation of the cascade stage and have no influence on the particular function of the circuit. According to a further feature of the invention the time switch can be tripped by a photo-electric device which like the time switch itself is substantially independent of the applied voltage, ambient temperature and the effect of unwanted light. Preferably a photodiode is used as the corresponding switching element. The photodiode can then be so connected to the time switch that it either sets the time switch in action with increased lighting or with darkening. The time switch is therefore tripped by a temporary fall of the voltage at the contact point A. FIG. 5 shows an exemplified embodiment of this type of arrangement in accord with the invention.

The mode of operation of the time switch (FIG. 5) is unaltered. The resistance 101 is inserted as a protective resistance for the photodiode 103. Condenser 102 serves to separate with equal potential (D.C.) the point A from the working potential of the photodiode. The photodiode now has a so-called dark current through the resistance 101. This dark current is dependent on the ambient temperature and the residual lighting or uncontrolled light influence of the photodiode. Since this current only varies with temperature and residual lighting variations and these change very slowly, the effect on point A through condenser 102 remains without any importance for the time switch. If the photodiode 103 is struck by a light beam intended to effect tripping, then the current through the photodiode increases while there is a noticeably smaller fall of potential therethrough. This impulse is transmitted by the condenser 102 to the point A and thus momentarily cuts off the transistor 17. The relay reacts as described above and closes its auxiliary contact. Thus auxiliary contact now ensures the complete passing of the previously regulated time. After the passing of this time the time switch returns again to its rest position. It is therefore immaterial whether the photodiode is still illuminated or has already been redarkened. On darkening the photodiode the potential of the same increases again. This impulse is likewise transmitted to point A, but has no effect upon the time switch, since it only reinforces the effect of resistance 7. Should the photodiode be required to initiate the operation of the time switch upon darkening of the photodiode, then the photodiode 103 and the resistance 101 are interchanged with one another. The tripping light impulses can provide any desired length. It is however preferable not to go below a minimum time of 0.1 second. As described above, complete temperature compensation between the usual temperature limits is provided by equi-potential separation by means of condenser 102. Likewise the circuit is insensitive to slow light variations, as for example are produced by daily light influences. Since the light effects on the photodiode 103 can reach uncontrollable proportions, resistance 9 has again been inserted as in FIG. 1, despite the high voltage amplification of the cascade connection. Should the time switch be required to work as a dusk switch then, as shown in FIG. 6, two photodiodes are arranged in parallel in the form of a bridge circuit so that they lie at the same temperature-voltage potentials. Hence the one photodiode must be darkened and the other struck by the light that is to be measured. If the intensity value of the light to be measured is nearly or exactly equal to the intensity value of the darkened diode, then the voltage potential at both diodes is the same. A transistor additionally connected to this bridge thus remains cut off. The bridge potential is now independent of temperature and voltage variations. By means of the potentiometer 108 the bridge circuit is adjusted for a certain intensity value. If the photodiode 103 is used as the measuring diode, then the apparatus works as a darkness switch i.e. upon fall in light intensity operation occurs if the voltage potential at the photodiode 103 rises above the voltage potential at the photodiode 106. This condition occurs if the degree of brightness to be accepted at the photodiode 103 permits the photo current of this diode to decrease to such an extent that the potential drop at the resistance 107 becomes smaller than the potential drop at potentiometer 108. Thus base current flows through transistor 109. The collector-emitter circuit of transistor 109 is thereby conductive. The voltage potential at condenser 102 now falls suddenly, so that tripping of the time switch occurs. The same relationships hold if the photodiode 106 is used as the measuring diode, however the circuit in this case reacts with increased light intensity. The circuit can thus be used for both switching-on and switching-off operations, in that when the lighting is cut off the photodiode 103 is available for measuring, and when the lighting returns the photodiode 106 is used for measuring. The condensers 110 and 111 prevent unwanted operation by momentary light variations.

According to the invention it is further possible to use the time switch in simple ways as a programming switch, without the necessity of a separate time switch for each switching operation. This is made possible by the present invention in that the recharging operation of the condenser 4 in the timing circuit is likewise employed for determination of time. Thereby the time switch is in the position to switch predetermined lines one after the other in direct sequence. FIGS. 4, 7 and 8 show a further example of this switch according to the invention. FIG. 7 shows in more detail that the driving potential is fed through the secondary coil of the input transformer 13 and the rectifier 12 to the charging condenser 11. The circuit is thus ready for operation. The circuit of FIG. 1 is chosen as the basic circuit of the time unit. It is however replaced by FIG. 5. In forming the circuit of FIG. 7 the transistor 17 is not included so that the potentiometer formed by resistances 9 and 10 again becomes necessary. Because of the small amplification of the simple circuit the resistance 15 may not be inserted on the base lead of transistor 7. In the case of automatic switching, the resistance 6 need not be inserted as a protective resistance into the basic feed lead of the transistor 2, because the potentiometers 5a–5n and 7a–7n are preset potentiometers having a resistance value which in all circumstances will be more than zero. The resistance 5a passes so many charge carriers to the base of the transistor 2 that the transistor is switched on. The transistor 1 is consequently cut off and relay 3 is unoperated. The position of the selector switch 33 consequently remains unaltered. If the key S is momentarily actuated, then the coil of relay 3 is energised and the selector switch 33 moves one step. The condenser 4 in the timing circuit now receives potential through potentiometer 7a, and charging current flows through condenser 4 and the base of transistor 2. Transistor 2 remains conducting and the coil of relay 3 (selector) is without current. Consequently the selector 33 remains in the position now reached. After charging is completed the remaining charge carriers flow to the base of transistor 2 through resistance 18. Transistor 2 is cut off and transistor 1 is switched on. The coil of relay 3 receives potential, the selector moves a further step. Because of the now existing charging potential on condenser 4, the transistor 2 remains cut off until the charging potential flows through potentiometer 5b. Transistor 2 switches on and the next switching operation is started. Thus the time cycle repeats until the selector reaches the end position. If the selector is so constructed to facilitate re-cycling then the programming is continued.

The separate times can be quite accurately defined by the different potentiometers 5a to 5n and 7a to 7n.

Stopping the operation is only possible by interrupting the driving potential.

The above described advantages of the time switch concerning insensitivity to supply, voltage changes and temperature reliability are also maintained in this switching.

FIG. 8 shows a modification of the simple time switch at several timing ranges. These timing ranges can be chosen arbitrarily by selector 16. They can however also, as shown in FIG. 7 be coupled with relay 3 and thus also represent a programming control which must however be initiated anew after each separate time lapse.

FIG. 4 is a simplification of FIG. 7. It leaves out resistance 18 and switch S. This circuit automatically sets itself into action laying on the driving potential. An interruption of the operation is only possible by interrupting the feed voltage. This operation is so produced that the base of transistor 2 during the charging operation is not held by resistance 18 to an exactly defined potential.

What we claim is:

1. In a timing circuit, in combination, a source of direct current, a first and a second transistor each having an emitter, collector and base, said transistor so arranged as to be subjected to equal ambient temperatures, means for connecting both transistor collectors to said direct current source and means for connecting both transistor emitters to said direct current source, a switching means having control means in the collector circuit of said second transistor, said switching means being operably responsive to the complete conduction of said second transistor, means for connecting the collector of said first transistor with the base of said second transistor so that said second transistor is rendered nonconductive on operation of said first transistor and vice versa, a resistor-condenser time-constant series circuit connected across said source and interrupted by a closing contact to start each timing period, the emitters of said transistors being connected to a pole of said direct current source between said condenser and said pole, the junction between said resistor and said condenser connected with the base of said transistor to render said first transistor conductive at the moment the voltage of said condenser passes through zero and the junction between said condenser and said contact connected across a resistor to said source to charge the said condenser through the base emitter circuit of said transistor upon the said closing contact being opened.

2. In a timing circuit, in combination, a source of direct current, a first, a second and a third transistor each having an emitter, collector and base, said transistors so arranged as to be subjected to equal ambient temperatures, means for connecting all of said transistor collectors to said source and means for connecting all transistor emitters to said source, an electromagnet switching relay having its operating winding in the collector circuit of said third transistor, said relay being operably responsive to the complete conduction of said second transistor to the base of said third transistor so that said third transistor is rendered nonconductive on operation of said transistor and vice versa, means for connecting the emitter of said first transistor to the base of said second transistor so that said transistor is rendered conductive on operation of said first transistor, a resistor-condenser time-constant series circuit connected across said source and interrupted by a closing contact to start each timing period, the emitters of said transistors being connected with a pole of said direct current source between said condenser and said pole, the junction between said resistor and said condenser being connected with the base of said first transistor to render said first transistor conductive at the moment the voltage of said condenser passes through zero and the junction between said condenser and said contact connected across a resistor to said source to charge the said contact through the base-emitter circuit of said first transistor upon the said closing contact being opened.

3. A timing circuit as in claim 1 in which the said closing contact is operated by a photoelectric device.

4. A timing circuit as in claim 2 in which the said closing contact is operated by a photoelectric device.

References Cited in the file of this patent

UNITED STATES PATENTS

| | | |
|---|---|---|
| 2,848,658 | Mitchell | Aug. 19, 1958 |
| 2,923,863 | Chesson et al. | Feb. 2, 1960 |
| 2,939,018 | Faulkner | May 31, 1960 |
| 2,970,228 | White et al. | Jan. 31, 1961 |
| 2,985,774 | Carbone et al. | May 23, 1961 |